US012348859B2

(12) United States Patent
Rao et al.

(10) Patent No.: US 12,348,859 B2
(45) Date of Patent: Jul. 1, 2025

(54) ADAPTIVE PERCEPTUAL QUALITY BASED CAMERA TUNING USING REINFORCEMENT LEARNING

(71) Applicant: NEC Laboratories America, Inc., Princeton, NJ (US)

(72) Inventors: Kunal Rao, Monroe, NJ (US); Sibendu Paul, West Lafayette, IN (US); Giuseppe Coviello, Robbinsville, NJ (US); Murugan Sankaradas, Dayton, NJ (US); Oliver Po, San Jose, CA (US); Srimat Chakradhar, Manalapan, NJ (US)

(73) Assignee: NEC Corporation, Tokyo (JP)

( * ) Notice: Subject to any disclaimer, the term of this patent is extended or adjusted under 35 U.S.C. 154(b) by 138 days.

(21) Appl. No.: 18/466,296

(22) Filed: Sep. 13, 2023

(65) Prior Publication Data
US 2024/0089592 A1    Mar. 14, 2024

Related U.S. Application Data

(60) Provisional application No. 63/406,709, filed on Sep. 14, 2022.

(51) Int. Cl.
*H04N 23/60* (2023.01)
*H04N 23/61* (2023.01)

(52) U.S. Cl.
CPC ............. *H04N 23/64* (2023.01); *H04N 23/61* (2023.01)

(58) Field of Classification Search
CPC ...... H04N 23/64; H04N 23/61; H04N 23/611; H04N 23/60; H04N 23/684; H04N 23/72; H04N 23/6811; H04N 23/6812; G06T 19/006
See application file for complete search history.

(56) References Cited

U.S. PATENT DOCUMENTS

2011/0110578 A1*  5/2011  Longo ................... G06T 7/0002
                                                                  382/278
2022/0377239 A1* 11/2022  Ding .................... H04N 23/684

OTHER PUBLICATIONS

Pillow library. https://pillow.readthedocs.io/en/stable/. (Retrieved on Aug. 10, 2023).

Bhardwaj, R., Xia, Z., Ananthanarayanan, G., Jiang, J., Shu, Y., Karianakis, N., . . . & Stoica, I. (Apr. 4, 2022). Ekya: Continuous learning of video analytics models on edge compute servers. In 19th USENIX Symposium on Networked Systems Design and Implementation (NSDI 22) (pp. 119-135).

(Continued)

*Primary Examiner* — Xi Wang
(74) *Attorney, Agent, or Firm* — Joseph Kolodka

(57) ABSTRACT

Systems and methods are provided for dynamically tuning camera parameters in a video analytics system to optimize analytics accuracy. A camera captures a current scene, and optimal camera parameter settings are learned and identified for the current scene using a Reinforcement Learning (RL) engine. The learning includes defining a state within the RL engine as a tuple of two vectors: a first representing current camera parameter values and a second representing measured values of frames of the current scene. Quality of frames is estimated using a quality estimator, and camera parameters are adjusted based on the quality estimator and the RL engine for optimization. Effectiveness of tuning is determined using perceptual Image Quality Assessment (IQA) to quantify a quality measure. Camera parameters are adaptively tuned in real-time based on learned optimal camera parameter settings, state, quality measure, and set of actions, to optimize the analytics accuracy for video analytics tasks.

20 Claims, 8 Drawing Sheets

(56) References Cited

OTHER PUBLICATIONS

De, K., & Masilamani, V. (Jul. 18, 2013). Image sharpness measure for blurred images in frequency domain. Procedia Engineering, 64, 149-158.
Diamond, S., Sitzmann, V., Julca-Aguilar, F., Boyd, S., Wetzstein, G., & Heide, F. (Jan. 6, 2021). Dirty pixels: Towards end-to-end image processing and perception. ACM Transactions on Graphics (TOG), 40(3), 1-15.
Grother, P., Grother, P., Ngan, M., & Hanaoka, K. (Sep. 11, 2019). Face recognition vendor test (frvt) part 2: Identification.
Hasler, D., & Suesstrunk, S. E. (Jun. 17, 2003). Measuring colorfulness in natural images. In Human vision and electronic imaging VIII (vol. 5007, pp. 87-95). SPIE.
Jang, S. Y., Lee, Y., Shin, B., & Lee, D. (Oct. 25, 2018). Application-aware IoT camera virtualization for video analytics edge computing. In 2018 IEEE/ACM Symposium on Edge Computing (SEC) (pp. 132-144). IEEE.
Jiang, J., Ananthanarayanan, G., Bodik, P., Sen, S., & Stoica, I. (Aug. 7, 2018). Chameleon: scalable adaptation of video analytics. In Proceedings of the 2018 conference of the ACM special interest group on data communication (pp. 253-266).
Kang, L., Ye, P., Li, Y., & Doermann, D. (Jun. 23, 2014). Convolutional neural networks for no-reference image quality assessment. In Proceedings of the IEEE conference on computer vision and pattern recognition (pp. 1733-1740).
Khani, M., Hamadanian, P., Nasr-Esfahany, A., & Alizadeh, M. (Jun. 19, 2021). Real-time video inference on edge devices via adaptive model streaming. In Proceedings of the IEEE/CVF International Conference on Computer Vision (pp. 4572-4582).
Kuehne, H., Jhuang, H., Garrote, E., Poggio, T., & Serre, T. (Nov. 6, 2011). HMDB: a large video database for human motion recognition. In 2011 International conference on computer vision (pp. 2556-2563). IEEE.
Liu, L., Jia, X., Liu, J., & Tian, Q. (Jun. 14, 2020). Joint demosaicing and denoising with self guidance. In Proceedings of the IEEE/CVF Conference on Computer Vision and Pattern Recognition (pp. 2240-2249).
Liu, X., Van De Weijer, J., & Bagdanov, A. D. (Jul. 21, 2017). Rankiqa: Learning from rankings for no-reference image quality assessment. In Proceedings of the IEEE international conference on computer vision (pp. 1040-1049).
Mittal, A., Moorthy, A. K., & Bovik, A. C. (Dec. 17, 2012). No-reference image quality assessment in the spatial domain. IEEE Transactions on image processing, 21(12), 4695-4708.
Moorthy, A. K., & Bovik, A. C. (May 18, 2010). A two-step framework for constructing blind image quality indices. IEEE Signal processing letters, 17(5), 513-516.
Niebles, J. C., Chen, C. W., & Fei-Fei, L. (Sep. 5, 2010). Modeling temporal structure of decomposable motion segments for activity classification. In Computer Vision—ECCV 2010: 11th European Conference on Computer Vision, Heraklion, Crete, Greece, Sep. 5-11, 2010, Proceedings, Part II 11 (pp. 392-405). Springer Berlin Heidelberg.
Nishimura, J., Gerasimow, T., Sushma, R., Sutic, A., Wu, C. T., & Michael, G. (Oct. 7, 2018). Automatic ISP image quality tuning using nonlinear optimization. In 2018 25th IEEE International Conference on Image Processing (ICIP) (pp. 2471-2475). IEEE.
Paul, S., Drolia, U., Hu, Y. C., & Chakradhar, S. T. (Dec. 14, 2021). Aqua: Analytical quality assessment for optimizing video analytics systems. In 2021 IEEE/ACM Symposium on Edge Computing (SEC) (pp. 135-147). IEEE.
Paul, S., Rao, K., Coviello, G., Sankaradas, M., Po, O., Hu, Y. C., & Chakradhar, S. (Sep. 15, 2022). Why is the video analytics accuracy fluctuating, and what can we do about it?. In European Conference on Computer Vision (pp. 430-448). Cham: Springer Nature Switzerland.
Peli, E. (Oct. 4, 1990). Contrast in complex images. JOSA A, 7(10), 2032-2040.
Schwartz, E., Giryes, R., & Bronstein, A. M. (Sep. 30, 2018). Deepisp: Toward learning an end-to-end image processing pipeline. IEEE Transactions on Image Processing, 28(2), 912-923.
Su, S., Yan, Q., Zhu, Y., Zhang, C., Ge, X., Sun, J., & Zhang, Y. (Jun. 14, 2020). Blindly assess image quality in the wild guided by a self-adaptive hyper network. In Proceedings of the IEEE/CVF Conference on Computer Vision and Pattern Recognition (pp. 3667-3676).
Wu, C. T., Isikdogan, L. F., Rao, S., Nayak, B., Gerasimow, T., Sutic, A., . . . & Michael, G. (Nov. 14, 2019). VisionISP: Repurposing the image signal processor for computer vision applications. In 2019 IEEE International Conference on Image Processing (ICIP) (pp. 4624-4628). IEEE.
Xue, W., Mou, X., Zhang, L., Bovik, A. C., & Feng, X. (Sep. 8, 2014). Blind image quality assessment using joint statistics of gradient magnitude and Laplacian features. IEEE Transactions on Image Processing, 23(11), 4850-4862.
Zhang, B., Jin, X., Ratnasamy, S., Wawrzynek, J., & Lee, E. A. (Aug. 7, 2018). Awstream: Adaptive wide-area streaming analytics. In Proceedings of the 2018 Conference of the ACM Special Interest Group on Data Communication (pp. 236-252).
Zhang, K., Zuo, W., & Zhang, L. (May 25, 2018). FFDNet: Toward a fast and flexible solution for CNN-based image denoising. IEEE Transactions on Image Processing, 27(9), 4608-4622.
Zhang, H., Ananthanarayanan, G., Bodik, P., Philipose, M., Bahl, P., & Freedman, M. J. (Mar. 27, 2017). Live video analytics at scale with approximation and {Delay-Tolerance}. In 14th USENIX Symposium on Networked Systems Design and Implementation (NSDI 17) (pp. 377-392).

\* cited by examiner

600

Assessment and selection of a design for a perceptual image quality assessment (IQA) method
602

↓

Analyzing multiple different no-reference (blind) IQA methods (e.g., designed to estimate the quality of real-world distorted images) for selection as APT's quality evaluator
604

↓

Training the multiple different no-reference IQA methods in a controlled scene and in real-world deployments
606

↓

Assessing the impact of using different IQA estimators as reward functions on the analytics performance under the same environmental conditions
608

↓

Training the APT using reinforcement learning by utilizing each of these quality estimator outputs as the reward function for a predetermined time period
610

↓

Executing RL by passing each video frame through a convolutional neural network (CNN), or other type of DNN, trained on a large-scale image dataset, with the CNN acting as a feature extractor, transforming each frame into a high-dimensional feature vector and generating output of a sequence of feature vectors corresponding to the sequence of frames in the video
612

↓

Passing the sequence of feature vectors through a temporal feature aggregation layer to capture temporal dependencies between video frames.
614

↓

Outputting a generated model prediction for each frame of the video stream, taking into account both the visual content of the frames, and the temporal dependencies between them.
616

FIG. 6

ADAPTIVE PERCEPTUAL QUALITY BASED CAMERA TUNING USING REINFORCEMENT LEARNING

RELATED APPLICATION INFORMATION

This application claims priority to U.S. Provisional App. No. 63/406,709, filed on Sep. 14, 2022, incorporated herein by reference in its entirety.

BACKGROUND

Technical Field

The present invention relates to improved video analytics accuracy using reinforcement learning, and more particularly to improving video analytics accuracy for better detection and tracking of objects and faces in a video by adaptive perceptual quality (APQ)-based camera tuning using a neural network with reinforcement learning to reduce fluctuations in accuracy of detection and tracking of objects and faces in a video.

Description of the Related Art

Cameras are increasingly being deployed in cities, enterprises, and roads world-wide to enable many applications in public safety, intelligent transportation, retail, healthcare, and manufacturing. Often, after initial deployment of the cameras, the environmental conditions and the scenes around these cameras change, and our experiments show that these changes can adversely impact the accuracy of insights from video analytics. This is at least in part because the camera parameter settings, though potentially optimal at deployment time, are not the best settings for high-quality video capture as the environmental conditions and scenes around a camera change during operation. Capturing poor-quality video adversely affects the accuracy of analytics.

The number of Internet of Things (IoT) sensors, especially video cameras deployed around the world have proliferated tremendously. It is estimated that their number will continue to grow further, thanks to advances in computer vision, machine learning, etc. and infrastructure support through 5G, edge computing, cloud computing, etc. These video cameras are being used for a variety of applications including video surveillance, intelligent transportation, healthcare, retail, entertainment, safety and security, and home and building automation.

The adverse impact of capturing poor-quality video causes a reduction in detection count accuracy and thus overall system performance, and extends to multiple video analytics applications, including, for example, those that rely on object or face detection insights for higher-level tasks like object tracking or person recognition.

SUMMARY

According to an aspect of the present invention, a method is provided for dynamically tuning camera parameters in a video analytics system (VAS) to optimize analytics accuracy, including capturing a current scene using a video-capturing camera, and learning optimal camera parameter settings for the current scene using a Reinforcement Learning (RL) engine by defining a state within the RL engine as a tuple of a first vector representing current camera parameter values and a second vector representing measured values of captured frames of the current scene. Sets of actions for modifying parameter values and maintaining the current parameter values are defined, and a quality of the captured frames is estimated using a perceptual no-reference quality estimator. Camera parameter settings are tuned based on the quality estimator and the RL engine to optimize analytics accuracy of the VAS. An effectiveness of the tuning can be evaluated by perceptual Image Quality Assessment (IQA) to quantify a quality measure. Camera parameter settings can be iteratively adaptively tuned in real-time using the RL engine, responsive to changes in the scene, based on the learned optimal camera parameter settings, the state, the quality measure, and the set of actions, to further optimize the analytics accuracy until a threshold condition is reached.

According to another aspect of the present invention, a system is provided for dynamically tuning camera parameters in a video analytics system (VAS) to optimize analytics accuracy, including a video-capturing camera for capturing a current scene and a Reinforcement Learning (RL) engine for learning optimal camera parameter settings for the current scene by defining a state within the RL engine as a tuple of a first vector representing current camera parameter values and a second vector representing measured values of captured frames of the current scene. Sets of actions for modifying parameter values and maintaining the current parameter values are defined, and a quality of the captured frames is estimated using a perceptual no-reference quality estimator. Camera parameter settings are tuned based on the quality estimator and the RL engine to optimize analytics accuracy of the VAS. An effectiveness of the tuning can be evaluated by perceptual Image Quality Assessment (IQA) to quantify a quality measure. Camera parameter settings can be iteratively adaptively tuned in real-time using the RL engine, responsive to changes in the scene, based on the learned optimal camera parameter settings, the state, the quality measure, and the set of actions, to further optimize the analytics accuracy until a threshold condition is reached.

According to another aspect of the present invention, a non-transitory computer readable storage medium including contents that are configured to cause a computer to perform a method for dynamically tuning camera parameters in a video analytics system (VAS) to optimize analytics accuracy, including capturing a current scene using a video-capturing camera, and learning optimal camera parameter settings for the current scene using a Reinforcement Learning (RL) engine by defining a state within the RL engine as a tuple of a first vector representing current camera parameter values and a second vector representing measured values of captured frames of the current scene. Sets of actions for modifying parameter values and maintaining the current parameter values are defined, and a quality of the captured frames is estimated using a perceptual no-reference quality estimator. Camera parameter settings are tuned based on the quality estimator and the RL engine to optimize analytics accuracy of the VAS. An effectiveness of the tuning can be evaluated by perceptual Image Quality Assessment (IQA) to quantify a quality measure. Camera parameter settings can be iteratively adaptively tuned in real-time using the RL engine, responsive to changes in the scene, based on the learned optimal camera parameter settings, the state, the quality measure, and the set of actions, to further optimize the analytics accuracy until a threshold condition is reached.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 6 is a block/flow diagram illustratively depicting a method for increasing accuracy of video analytics tasks in real-time by adaptive perceptual quality-based camera tuning (APT) using a neural network with reinforcement learning to improve accuracy of detection and tracking of objects and faces in a video, in accordance with embodiments of the present invention;

DETAILED DESCRIPTION

Figure 1:
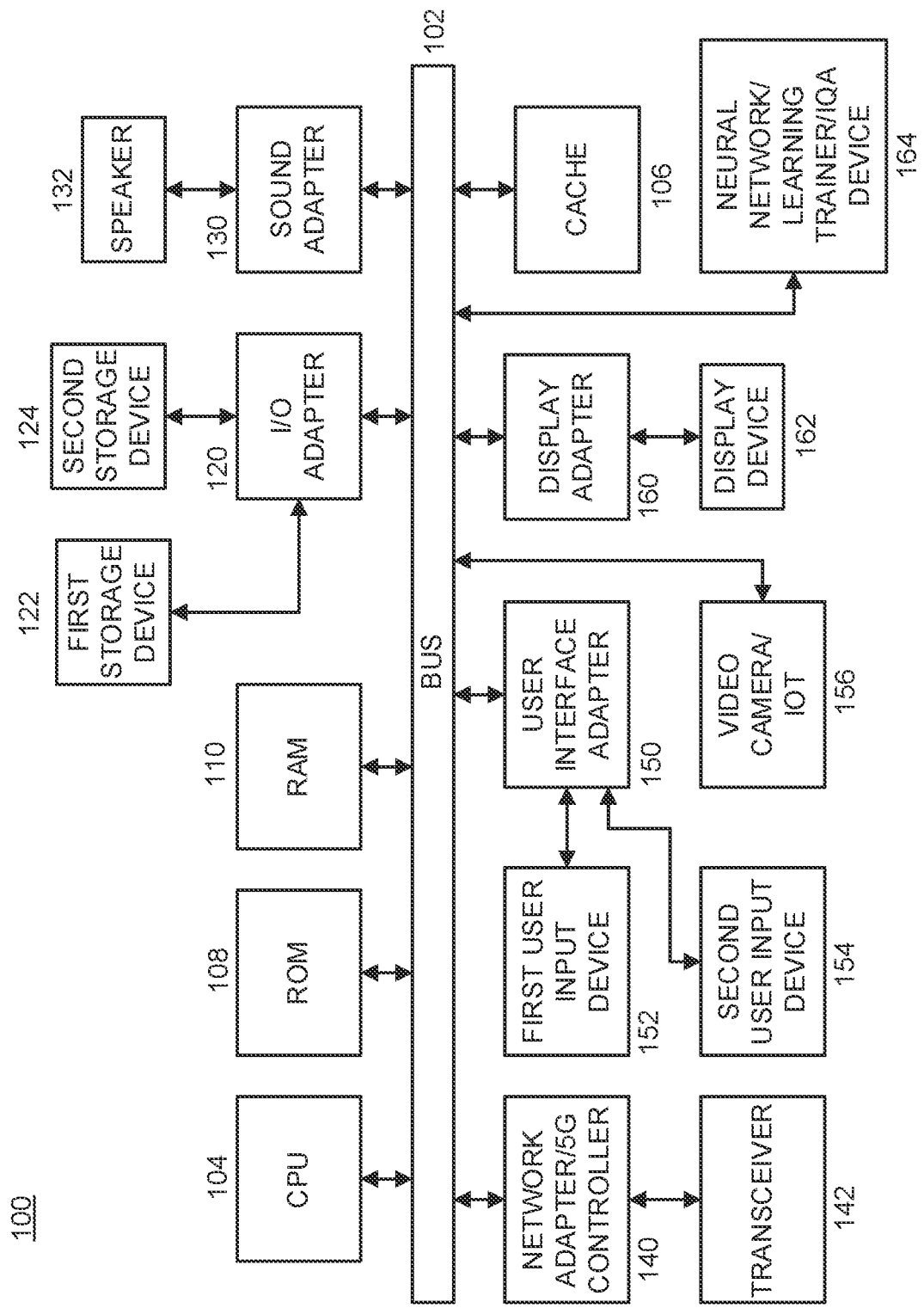
FIG. 1 shows a block diagram illustratively depicting an exemplary processing system to which the present invention may be applied, in accordance with embodiments of the present invention.

In accordance with embodiments of the present invention, systems and methods are provided for improving video analytics accuracy in real-time for better detection and tracking of objects and faces in a video by adaptive perceptual quality-based camera tuning (APT) using a neural network with reinforcement learning, and thus, increasing accuracy of detection and tracking of objects and faces across video frames of the video.

In some embodiments, to mitigate the loss in accuracy of insights when using conventional systems and methods, the present invention can utilize a reinforcement-learning based system APT that dynamically, automatically, and remotely (e.g., over 5G networks, WiFi, etc.), tunes the camera parameters, to ensure a high-quality video capture, which can effectively mitigate any losses or fluctuations in accuracy of video analytics. As a result, such tuning restores the accuracy of insights even when environmental conditions or scene content change. APT can utilize reinforcement learning, with a no-reference perceptual quality estimation as the reward function. Extensive real-world experiments were conducted, in which two cameras were simultaneously deployed side-by-side overlooking an enterprise parking lot (one camera only has manufacturer-suggested default setting, while the other camera is dynamically tuned by APT during operation). The experiments demonstrated that in the instance in which dynamic tuning by APT was performed, the analytics insights are consistently better at all times of the day, and the accuracy of object detection video analytics application was improved on average by 42% over conventional systems and methods. Since the reward function utilized according to embodiments of the present invention can be independent of any analytics task, APT can be readily used for any sort of different video analytics tasks, in accordance with aspects of the present invention.

In some embodiments, a city-scale deployment of IoT cameras and video analytics can be performed on the videos/video feeds acquired using such cameras, in accordance with aspects of the present invention. The video feeds from the cameras can be streamed (e.g., over 5G Networks), and the analytics can be performed in the edge/cloud infrastructure. Based on the results of the analytics, insights can be generated and appropriate actions can be taken. As the environmental conditions around the cameras (e.g., day or night, seasonal variations, rain, snow, etc.) and/or the scene in front of the camera (e.g., number of people/cars/objects) change, the quality of video feed produced by the cameras also changes. This is at least in part due to the manner in which cameras capture, process, encode and transmit video frames before they are delivered to Analytics Units (AUs) in a Video Analytics Pipeline (VAP).

The accuracy of video analytics application can be impacted by variations in environmental conditions and/or in the scene in front of the camera, often causing the accuracy to significantly degrade due to such variations. One of the reasons for this degradation is the poor quality of frames being delivered to the AUs. Camera vendors often expose a large number of camera parameter settings to end users so that they can tune them according to their deployment location. These camera parameters play a significant role in the quality of frames being produced by the camera and delivered to the AUs. In various embodiments, by automatically and dynamically adjusting these camera parameter values, the quality of frames can be significantly improved, and thereby mitigate the loss in analytics accuracy due to changes in environment or video content.

This adjustment in camera parameter values, however, can be challenging to accomplish satisfactorily, at least in part because desirable, optimal adjustment values vary according to the condition and are very specific to the deployment location. There is not any single adjustment setting that works across all conditions and across all deployment locations. Therefore, in various embodiments, video analytics accuracy can be improved by performing dynamic adjustments to camera parameters to automatically adapt to the changing conditions at the specific deployment location for improved video analytics accuracy, in accordance with aspects of the present invention.

In some embodiments, to mitigate the loss in analytics accuracy, camera parameters can be adaptively tuned in real time using reinforcement learning. In an illustrative embodiment, four camera parameters, (e.g., brightness, color, contrast, and sharpness), which directly affect the quality of image produced by the video camera, can be dynamically tuned. Such dynamic tuning of camera parameters can be executed automatically and/or remotely over a computing network (e.g., 5G, WiFI, etc.), and leads to better quality of the video feed, which directly helps in improving the analytics accuracy, in accordance with aspects of the present invention.

In some embodiments, with regard to reinforcement learning, for the agent to learn and adapt to the changes in conditions, a perceptual no-reference quality estimator can be utilized as a reward function. Experimental results show that such a reward function functions optimally for adjusting camera settings in a variety of environmental conditions, resulting in such that fluctuations in analytics accuracy for videos is significantly mitigated. This technique is independent of the type of video analytics being performed, and therefore can be effectively deployed in any type of real-world environments and settings (e.g., IoT, autonomous vehicle navigation and control, video security systems, etc.), in accordance with aspects of the present invention.

In accordance with various embodiments, calculating the perceptual quality for a video stream can be performed using several different calculation methods, but testing and comparing them to check which one is optimal for real-world setting is can present a challenge. For example, it is not feasible to attempt to repeat testing in an exact same environment with the exact same video content changes if the video analytics system (VAS) of the present invention is deployed in real-world environments. Such a setup generally will not lead to an "apples to apples" comparison, as the scene will likely not be static and it is unknown what video content changes may occur. Also, if different methods are attempted at the same time, then it is not practical to simultaneously deploy as many cameras as the number of methods to calculate perceptual quality for each method on each camera at the same time. Thus, development of the VAS system according to embodiments of the present invention included utilizing a mock experimental setup which enables repeating an exact same environment and video content changes in a controlled setting to objectively test and compare different perceptual quality estimators one-by-one.

Experimental results empirically show that changes in environmental conditions and video content can have adverse effect on video analytics accuracy, and this loss in accuracy can be mitigated by dynamically tuning camera settings, in accordance with aspects of the present invention.

In some embodiments, an adaptive perceptual camera tuning (APT) system can utilize a neural network and reinforcement learning (RL) to automatically and adaptively tune camera parameters remotely (e.g., over 5G, WiFi, etc.) to generate a high-quality video feed, which directly correlates to improving video analytics insights. A convolutional neural network (CNN)-based state-of-the-art perceptual quality estimator (e.g., RankIQA) can be utilized as the reward function in RL, thus making APT deployment and usage independent of the type of analytics being performed and feasible in absence of ground-truth, in accordance with aspects of the present invention.

The adaptive camera-parameter-tuning of the present invention can result in consistent analytics accuracy improvement through any different time segments of the day in any environments, and experimental results show that it achieves an average improvement of 42% as compared to the accuracy observed under fixed, manufacturer-provided default setting, as utilized by conventional systems and methods, in accordance with aspects of the present invention.

Some conventional systems and methods have considered the impact of environmental condition changes on video analytics accuracy but they adapt to such changes by using different AUs depending on specific environmental condition, while keeping the camera settings the same. Since environmental changes can take place due to change of the sun's movement throughout the day, different weather conditions (e.g., rain, fog and snow), as well as for different deployment sites (e.g., parking lot, shopping mall, airport), it is infeasible and sub-optimal to attempt to develop a separate AU specific to each environment. Other systems attempt to account for environmental changes on AU accuracy, but they address such changes by re-training the AUs using transfer learning. In contrast, the present invention can utilize APT without adjusting or retraining the AUs by automatically and dynamically tuning camera parameter settings responsive to changes in environmental conditions using reinforcement learning, in accordance with aspects of the present invention.

Some conventional systems and methods have attempted to improve video analytics accuracy by periodically re-training AI/ML models so that they work well for the specific deployment conditions, but this technique is sub-optimal because it requires additional computational resources and it cannot quickly adapt to the changes in the environment or video content. In various embodiments, however, the present invention does not rely on continuous re-training, but rather can improve video analytics accuracy by dynamically tuning configurable camera parameters, thereby quickly reacting to the changes in environmental conditions or video content, in accordance with aspects of the present invention.

Some conventional systems and methods configure image signal processing pipeline (ISP) in cameras to improve camera capture quality. For example, VisionISP modifies the ISP pipeline to reduce the size of final image output by reducing the bit-depth and resolution, and others have proposed custom optimizations of the ISP for specific computer-vision tasks. However, careful re-design or optimization of ISP module for specific vision tasks is not feasible in real-world scenarios at least in part due to the time constraints and processing power requirements for scalability to high numbers of particular tasks and/or environments in which such computer-vision tasks are utilized. In various embodiments, the present invention does not modify the ISP pipeline, but rather can automatically and dynamically tune configurable camera parameters to consistently produce high-quality video output using reinforcement learning, which enhances the quality of insights from analytics tasks, in accordance with aspects of the present invention.

When performing video analytics applications (e.g., real-time surveillance of an area, object and person detection for autonomous vehicle navigation, facial recognition for unlocking doors, etc.) using conventional systems and methods, the accuracy of video analytics applications declines across video frames when environmental conditions and/or video content changes. Such environmental condition and video content variations can adversely impact analytics accuracy, but this loss in accuracy can be mitigated by adjusting camera parameter values using reinforcement learning, in accordance with aspects of the present invention.

For illustrative purposes, the impact of environment and content variation on AU accuracy will be described with regard to four popular parameters included in nearly all video cameras: brightness, contrast, color-saturation (also known as colorfulness), and sharpness. Although the below discussion with be focused on the above-mentioned exemplary four parameters (which are particularly illustrative because they are widely available in both PTZ and non-PTZ cameras, and these parameters are more challenging to tune due to their large range of parameter values (e.g., between 1 and 100)), it is to be appreciated that the present invention can be utilized for any different types of camera parameters and settings, in accordance with aspects of the present invention.

During experimentation, analyzing the impact of camera settings on video analytics poses a significant challenge, as it includes applying different camera parameter settings to the same input scene and measuring the difference in the resulting accuracy of insights from an AU. One approach can be to use multiple cameras with different camera parameter settings to record the same input scene. However, such an approach is impractical as there are thousands of different combinations of even just the four camera parameters considered in this exemplary embodiment. To overcome the challenge during the experiments, the impact of camera settings adjustments on a stationary scene with a real camera was analyzed, and for comparison, a post-capture image transformation on pre-recorded video snippets from public datasets was utilized to analyze the equivalent impact of different camera settings on those video snippets (e.g., groups of frames of a video).

In accordance with various embodiments, further experiments investigating the influence of fluctuations in environmental conditions on the accuracy of facial recognition analytics units (AUs) were performed, including simulating both day and night scenarios within controlled laboratory settings and evaluate the performance of a highly accurate face-recognition AU (Neoface-v3). Two sources of light can be used, with one always being turned on, while the other light can be manually turned on or off to emulate day and night conditions, respectively.

To initiate the analysis in this exemplary embodiment, facial cutouts belonging to 12 distinct individuals can be positioned in front of the camera. The initial evaluation can employ a facial recognition pipeline using the "Default" camera setting, representing the manufacturer's predefined values, and for different face matching thresholds. Since this face-recognition AU has high precision despite environment changes, a focus can be on measuring Recall (i.e., true-positive rate). It is notable that under the "Default" settings, the Recall for the day condition goes down at higher thresholds, indicating that some faces were not recognized, whereas for the night condition, the Recall remains constant at a low value for all thresholds, indicating that some faces were not being recognized regardless of the face matching thresholds. Thus, the performance of face-recognition AU (i.e., recall vs matching threshold) under "Default" camera setting varies for different environment while capturing the same static scene.

Next, AU results under the "Default" camera settings, and "Best" settings for the four camera parameters can be compared. To find the "Best" settings, the four camera parameters can be changed using the VAPIX API provided by the camera vendor to find the setting that gives the highest Recall value. Specifically, each parameter can be varied from 0 to 100 in steps of 10 and the frames can be captured for each camera setting. This results in $\approx 14.6$ K($11^4$) frames for each condition. It is notable that the alteration of a single camera parameter via the VAPIX API requires approximately 200 ms, resulting in a cumulative time investment of about 7 hours for the capture and processing of frames per condition.

In contrast, when the camera parameters for both conditions are changed to the "Best" settings, the AU can achieve the highest Recall (100%), confirming that all the faces are correctly recognized, which shows that it is possible to improve AU accuracy by adjusting the four camera parameters in a controlled setting, in accordance with aspects of the present invention.

In some embodiments, the impact of video content variation on AU accuracy can be studied by using pre-recorded videos with different video content (e.g., different environmental conditions, settings, etc.). The pre-recorded videos from public datasets can be already captured under particular camera parameter settings, and hence there is not an opportunity to change the real camera parameter settings on pre-recorded videos. As an approximation, different values of brightness, contrast, color-saturation and sharpness can be applied to these pre-recorded videos using several image transformation algorithms (e.g., from the Python Imaging Library (PIL)), and then observe the impact of such transformation on accuracy of AU insights.

Nineteen (19) video snippets from the large human motion database (HMDB) dataset and eleven (11) video snippets from the Olympics dataset, which capture different content under different environmental conditions while using the default camera parameter can be utilized for this illustrative embodiment. The face and person bounding boxes can be manually annotated (e.g., using Computer Vision Annotation Tool (CVAT) to form a ground truth). Each video-snippet can contain a relatively small number of framers (e.g., less than a few hundred frames), and the environmental conditions can vary across the video snippets (e.g., due to change in video capture locations, environmental conditions, etc.).

In various embodiments, a single best tuple of those four transformations can be determined for each video, (e.g., a tuple that results in the highest analytical quality for that video), in accordance with aspects of the present invention. Experimental results show that the best (i.e., optimal) transformation tuples for different videos (e.g., videos that capture different content under various environmental conditions and settings) in a dataset do not cluster, confirming that any fixed real camera parameter settings are generally not ideal for capturing videos with different environmental conditions, settings, or input content. As such, it is shown that fixed camera parameter settings also result in low quality video analytics for captured video streams for any of a plurality of video analytics tasks. In some embodiments, video analytics quality improvement was observed by experimentation to be as high as a 58% improvement in accuracy of insights after transforming each video-snippet per their best transformation tuple and/or applying optimal camera parameter settings, in accordance with aspects of the present invention.

As discussed above, environmental changes and input content variations can result in low-quality image acquisition, which in turn can result in poor analytics accuracy. Tuning the camera parameter settings during capture can provide improvement in accuracy of AUs, but such camera parameter tuning is not feasible or practical for a human to do manually because the best parameter combination can vary with location of the camera, the type of analytics units, and real-time changes in the environmental conditions where the camera is deployed.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Aspects of the present invention are described below with reference to flowchart illustrations and/or block diagrams of methods, systems and computer program products according to embodiments of the present invention. It is noted that each block of the flowcharts and/or block diagrams, and combinations of blocks in the flowcharts and/or block diagrams, may be implemented by computer program instructions.

The flowchart and block diagrams in the figures illustrate the architecture, functionality, and operation of possible implementations of systems, methods and computer program products according to various embodiments of the present invention. Each block in the flowchart or block diagrams may represent a module, segment, or portion of code, which comprises one or more executable instructions for implementing the specified logical function(s), and in some alternative implementations of the present invention, the functions noted in the block may occur out of the order noted in the figures. For example, two blocks shown in succession may, in fact, be executed substantially concurrently, may sometimes be executed in reverse order, or may be executed in any other order, depending on the functionality of a particular embodiment.

It is also noted that each block of the block diagrams and/or flowchart illustration, and combinations of blocks in the block diagrams and/or flowchart illustration, can be implemented by specific purpose hardware systems that perform the specific functions/acts, or combinations of special purpose hardware and computer instructions according to the present principles.

Referring now to the drawings in which like numerals represent the same or similar elements and initially to FIG. 1, an exemplary processing system 100, to which the present principles may be applied, is illustratively depicted in accordance with embodiments of the present principles.

In some embodiments, the processing system 100 can include at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid-state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160. One or more video cameras 156 can be further coupled to system bus 102 by any appropriate connection system or method (e.g., Wi-Fi, wired, network adapter, etc.), in accordance with aspects of the present invention.

A first user input device 152 and a second user input device 154 are operatively coupled to system bus 102 by user interface adapter 150. The user input devices 152, 154 can be one or more of any of a keyboard, a mouse, a keypad, an image capture device, a motion sensing device, a microphone, a device incorporating the functionality of at least two of the preceding devices, and so forth. One or more video cameras 156 can be included, and the video cameras can include one or more storage devices, communication/networking devices (e.g., WiFi, 4G, 5G, Wired connectivity), hardware processors, etc., in accordance with aspects of the present invention. In various embodiments, other types of input devices can also be used, while maintaining the spirit of the present principles. The user input devices 152, 154 can be the same type of user input device or different types of user input devices. The user input devices 152, 154, and camera 156 are used to input and output information to and from system 100, in accordance with aspects of the present invention. A neural network/transfer learning trainer 164 can be operatively connected to the system 100 for retraining of a deep neural network using transfer learning to improve accuracy of video analytics tasks, in accordance with aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that systems 200, 300, 400, 700, and 800, described below with respect to FIGS. 2, 3, 4, 7, and 8, respectively, are systems for implementing respective embodiments of the present invention. Part or all of processing system 100 may be implemented in one or more of the elements of systems 200, 300, 400, 700, and 800, in accordance with aspects of the present invention.

Further, it is to be appreciated that processing system 100 may perform at least part of the methods described herein including, for example, at least part of methods 200, 300, 500, 600, and 800, described below with respect to FIGS. 2, 3, 5, 6, and 8, respectively. Similarly, part or all of systems 200, 300, 400, 700, and 800 may be used to perform at least part of methods 200, 300, 500, 600, 700, and 800 of FIGS. 2, 3, 5, 6, and 8, respectively, in accordance with aspects of the present invention.

As employed herein, the term "hardware processor subsystem", "processor", or "hardware processor" can refer to a processor, memory, software, or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 2:
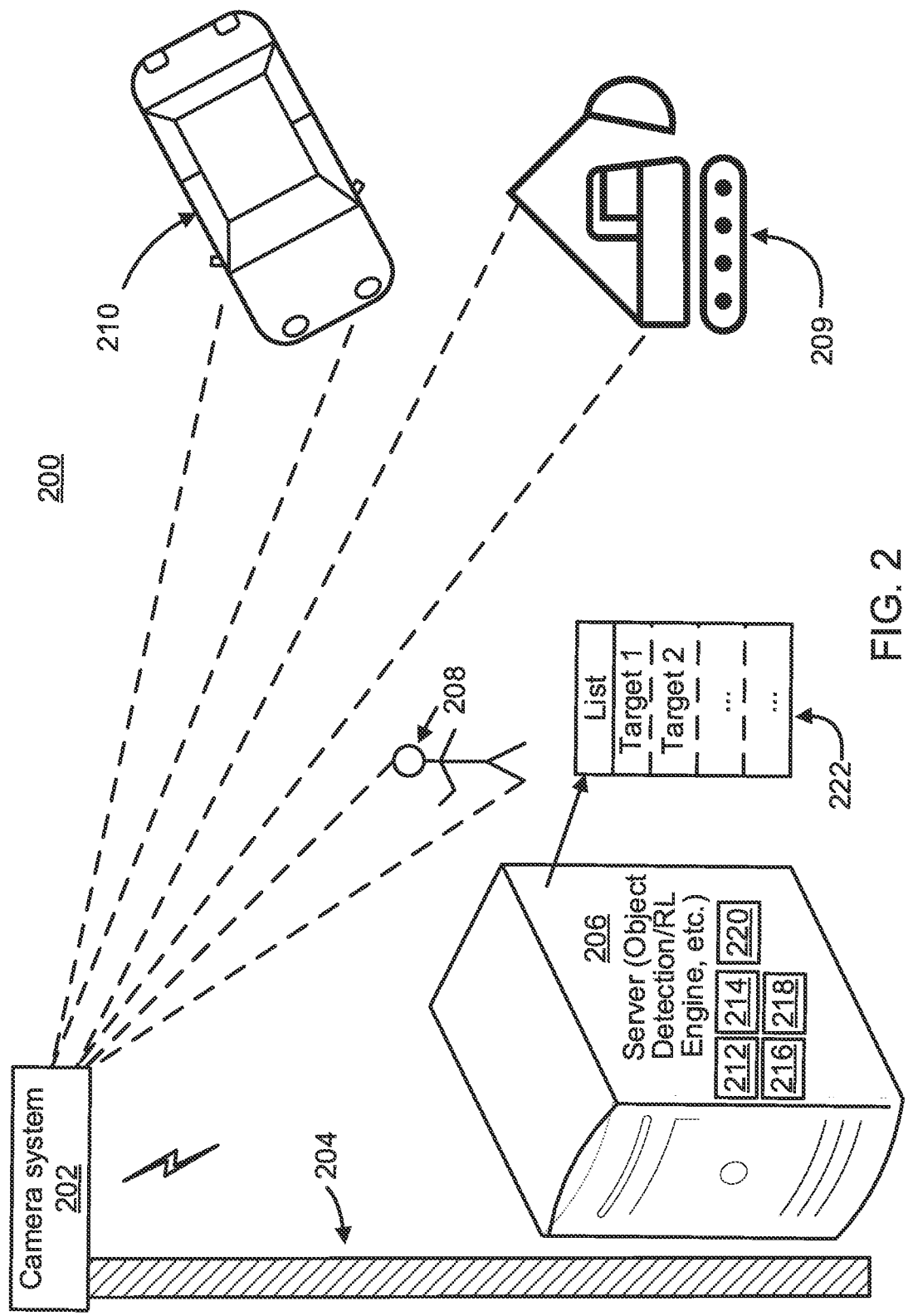
FIG. 2 shows a diagram illustratively depicting a high-level view of a system and method for real-time surveillance and identification of objects and people by adaptive perceptual quality-based camera tuning (APT) using a neural network with reinforcement learning to improve accuracy of detection and tracking of objects and faces in a video, in accordance with embodiments of the present invention.

Referring now to FIG. 2, a high-level system and method 200 for real-time surveillance and identification of objects and people by adaptive perceptual quality-based camera tuning (APT) using a neural network with reinforcement learning to improve accuracy of detection and tracking of objects and faces in a video, is illustratively depicted in accordance with embodiments of the present invention.

In an illustrative embodiment, a camera system 202 can be utilized to monitor an area of interest and/or capture video and/or images for processing for video analytics applications (e.g., object/person/animal detection, tracking, identification, etc.), and can include a wired and/or wireless connectivity device for providing connectivity with one or more computing networks (e.g., Internet, LAN, WAN, etc.), and local or remote computing devices (e.g., server 206, computer for vehicle 210, etc.). While the single camera system 202 is shown in FIG. 2 for the sakes of illustration and brevity, it is to be appreciated that multiple camera systems can also be used, in accordance with aspects of the present invention.

In various embodiments, the camera system 202 can be mounted on a mounting entity 204. For the sake of illustration, the mounting entity 204 is depicted as a pole. While a pole 204 is shown (as a mounting entity) for the sake of illustration, any other mounting entity can be used, as readily appreciated by one of ordinary skill in the art given the teachings of the present invention provided herein. For example, the camera system 202 can be mounted in or on any of the following: a building, a tree, a drone, etc., in accordance with aspects of the present invention, noting that the preceding examples of various mounting entities are merely illustrative. The camera system 202 can be a wireless camera system having its own antenna(s) or can use one or more antennas included on the pole 204 (or other mounting entity (e.g., building, drone, etc.) to which the camera system 202 is mounted or proximate).

In various embodiments, the system and method 200 can include a local or remote computing device, depicted herein for ease of illustration as a server 206, for processing video captured by the camera system 202 for any or a plurality of video analytics tasks (e.g., object/person/animal detection, tracking, identification, etc.). It is to be appreciated that any of a plurality of types or amount of computing devices can be used in block 206, as readily appreciated by one of ordinary skill in the art given the teachings of the present invention provided herein. For example, the computing device 206 can be one or more of any of the following: a server, a main-frame, a network of servers, a cloud, a personal computer, etc., in accordance with aspects of the present invention, noting that the preceding examples of various computing devices 206 are merely illustrative.

In various embodiments, the server 206 can perform video analytics applications, including detecting, tracking, and identifying objects (e.g., vehicle 210) and people 208 across multiple frames of a video captured by the camera system 202, with reduced fluctuations in accuracy of such video analytics applications across video frames by performing Reinforcement Learning (RL) using a Deep Neural Network (DNN) using transfer learning and/or adaptive tuning of a confidence threshold, in accordance with aspects of the present invention.

In various embodiments, the system and method 200 can accurately perform video analytics applications, including, for example, detection, tracking, and identification of objects, people, and animals in an area of interest in real time, and can transmit results of such video analytics applications to any of a plurality of computing devices for use in any of a plurality of application, including, for example, providing access to secure areas (e.g., using facial recognition), tracking a number of people in a particular area, detecting a particular person in a crowd, etc., in accordance with aspects of the present invention.

Such detection, tracking, and/or facial recognition can be with respect to a secured object such as, for example, a facility. The facility can be a secured facility or a non-secured facility. In one embodiment, the facility can be a secured facility implemented as an airport. Of course, other facilities (e.g., mass transit hub, sports complex, etc.) can also be monitored for detection and tracking of people 208 or objects 210, for facial recognition tasks, etc., in accordance with aspects of the present invention.

The server 206 can be located remote from, or proximate to, the camera system 202, and can include a processor 212 operatively coupled to a memory 214, a networking device 216, an image quality assessment device 218, which can be utilized as a proxy of quality measure (e.g., the reward function), and a Reinforcement Learning (RL) engine 220 configured for increasing accuracy of video analytics tasks in real-time by learning and identifying optimal camera parameter settings for dynamic scenes, and adaptively tuning video parameter settings responsive to changes in environmental conditions, in accordance with aspects of the present invention.

In an illustrative embodiment, the server 206 can be configured to perform object 210 and person 208 counts for a particular area of interest (e.g., taxi or train station to determine daily traffic, construction equipment 209 movements, etc.) based on video data received from the camera system 202 by (e.g., the networking device 216) of the server 206 to identify and provide a list 222 of object 210 and person 208 counts in the area of interest. In facial recognition embodiments, the server 206 can identify and store a list 222 of a plurality of different faces captured by the video camera and/or can store or access a database of known faces (e.g., person to grant/deny access for a facility) for comparison with the faces captured by the video camera and stored in the list 222, in accordance with aspects of the present invention. Such video analytics/facial recognition tasks can involve one or more actions performed responsive to the list 222, as readily appreciated by one of ordinary skill in the art. For example, an alert (local and/or remote) can be provided, one or more doors and/or windows can be closed and locked to secure the person 208 or vehicle 210 within a specific area or to keep the person 208, construction vehicle 209, etc. from accessing a specific area, a person or vehicle containment procedure (e.g., all doors to a room closing and locking with person inside) can be automatically performed, etc., in accordance with aspects of the present invention.

Accordingly, some exemplary suitable environments to which the present invention can be applied can include any environments where detection, tracking, and/or identification of objects, people, animals, etc. can prove useful (e.g., mass transit hubs, border crossings, subways, transportation hubs, airports, ship ports, sports facilities, etc.), in accordance with aspects of the present invention. It is to be appreciated that the preceding environments are merely illustrative and, thus, other environments can also be used, while maintaining the spirit of the present invention.

In an illustrative embodiment, the system and method 200 can be used for object/people detection tasks, noting that such object detection is one of the most common tasks in video analytics pipelines. For example, detecting cars or people in real-time can be critical for many real-world applications, including, for example, video surveillance, retail, health care monitoring and intelligent transportation systems. It is to be appreciated that although object/people detection tasks are discussed hereinbelow for ease of illustration as an example of a particular video analytics task performed by the present invention, object/person detection is merely one of one of a plurality of video analytics tasks capable of being performed and improved by the present invention, as would be appreciated by one of ordinary skill in the art.

In various embodiments, camera external factors that can affect the quality of the frames of a video processed by one or more DNNs during video analytics tasks can include, for example, motion in the field of view of the camera 202, which can affect the quality because of blurring caused by the movement of objects, lossy video compression methods (e.g., H.264, AV1, VP9, etc.), in which the quality of decoded frames can noticeably differ from the pre-compression frames, and environmental conditions (e.g., lighting, fog, camera angle, etc.).

In various embodiments, reinforcement learning using a DNN can be executed in block 220 to automatically adapt the camera parameters to improve the accuracy of AUs, in accordance with aspects of the present invention. The server 206 can be utilized to control a camera tuning framework that dynamically adapts a plurality of camera parameter settings, and for ease of illustration, four parameter settings of the video-capturing camera 202 in the video analytics system (VAS) 200 are described herein below for tuning to optimize the accuracy of video analytics tasks using corresponding AUs. However, it is to be appreciated that any parameter settings can be similarly tuned/adjusted to improve video analytics accuracy, in accordance with aspects of the present invention.

In some embodiments, reinforcement learning (RL) can be utilized in block 220 to determine the best camera settings for a particular scene to provide optimal AU accuracy for video analytics tasks. This learning can be performed in an online manner using RL, in which the system 200 can learn the best camera settings in real-time in any of a plurality of environmental conditions. By using RL in accordance with embodiments of the present invention, previous knowledge of the various scenes that the camera would observe is not necessary. Instead, the RL agent can learn and automatically identify the best (e.g., optimal) camera settings (e.g., settings which give the highest AU accuracy for any particular scene), in accordance with aspects of the present invention. For illustrative purposes, a State-action-reward-state-action (SARSA) RL algorithm can be selected for utilization for identifying the best camera settings. While RL is a fairly standard technique for training a neural network, applying it to tuning camera parameters in a real-time video analytics system has not been attempted by conventional systems and methods, and raises challenges in execution in practice.

In some embodiments, one such challenge can be that ground truth is unknown in practice in real time. Implementing the online RL approach can require knowing the quality (e.g., either reward or penalty) of every action taken during exploration and exploitation, and measuring the quality of camera parameters' changes in the absence of ground-truth can be challenging in practice in real-world situations. In various embodiments, the RL in block 220 can include utilizing state-of-the-art perceptual Image Quality Assessment (IQA) methods as a proxy of the quality measure (e.g., the reward function), and upon experimentally evaluating a list of state-of-the-art IQA methods in accordance with aspects of the present invention, a best-performing one can be selected as the reward function in the RL engine in block 220, which will be described in further detail herein below.

Figure 3:
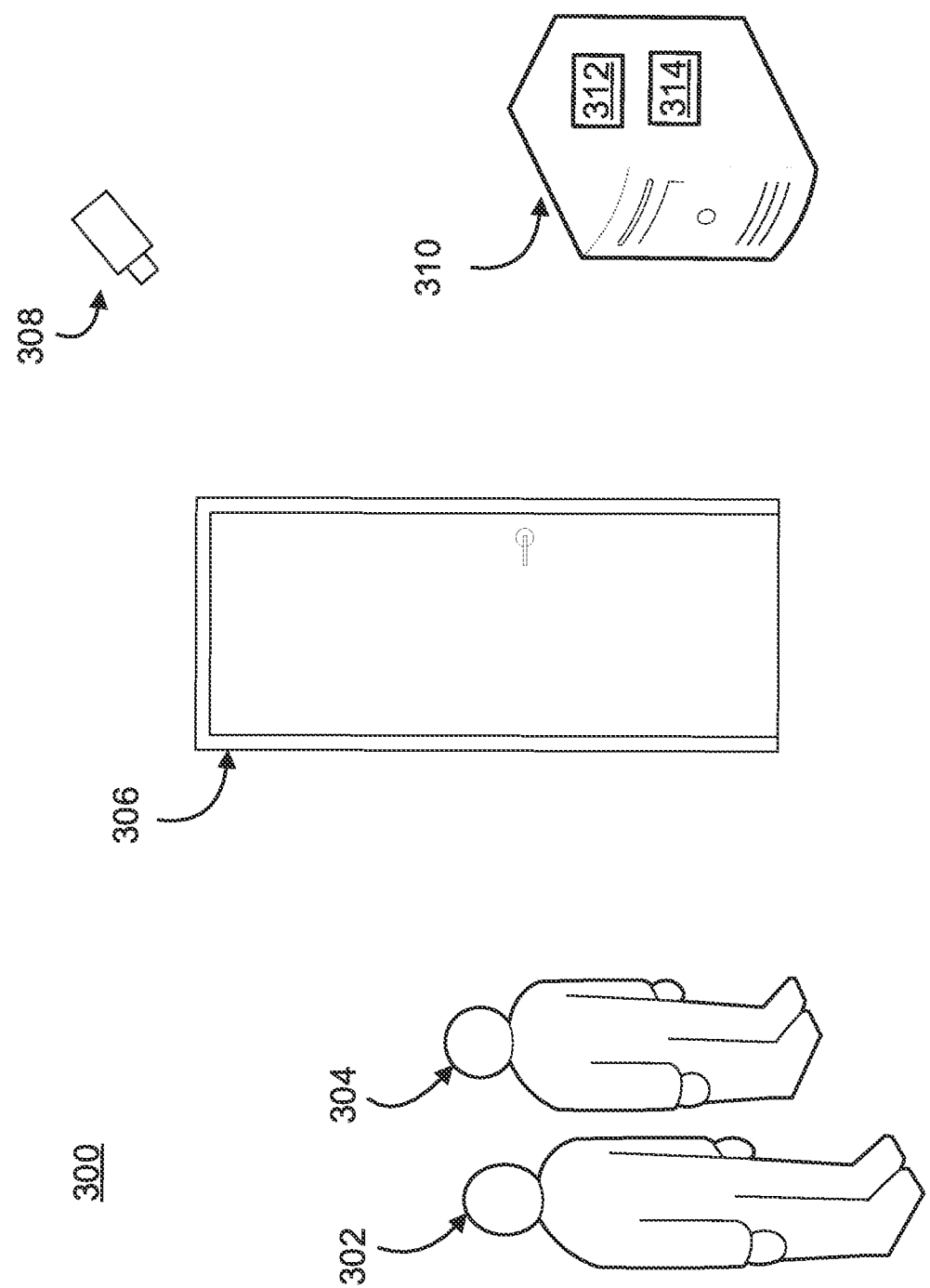
FIG. 3 is a diagram illustratively depicting an exemplary video surveillance system, including one or more video cameras, to which the present invention can be applied, in accordance with embodiments of the present invention.

Referring now to FIG. 3, with continued reference to FIG. 2, a diagram showing a high-level view of an exemplary video surveillance and security system and method 300, including one or more video cameras 308, is illustratively depicted in accordance with embodiments of the present invention.

In an illustrative embodiment, a facility (e.g., an office, hospital, etc.) can perform object and person tracking using the video surveillance and security system 300, in accordance with aspects of the present invention. The video surveillance and security system 300 can include a video processing system on a computing device 310 (e.g., server), similar to 206, as described with reference to FIG. 2 herein above. The video surveillance and security system 300 can deploy one or more video cameras 308 (hereafter "camera") in, for example, a hallway, to monitor the area. The camera 308 can monitor the hallway for security purposes. The video acquired using the camera 308 can be analyzed by a local or remote computing device 310 (e.g., server) using a perceptual no-reference quality estimator 312 and a reinforcement learning (RL) engine 314 to increase accuracy of video analytics applications, including, for example, facial detection/identification, object detection/identification, etc. Thus, the video surveillance and security system 300 can be utilized for a plurality of real-world tasks with increased video analytics accuracy, in accordance with aspects of the present invention.

For example, the video surveillance and security system 300 can unlock one or more doors 306 (hereafter "door") when a known user 302 approaches the door 306. Though the door 306 may not have an access panel for entry, it can be unlocked by the video security system 300 when the known user 302 approaches the door 306. The video processing system/server 310 can recognize a known user 302 even if the known user 302 is next to another user 304 by utilizing, a perceptual no-reference quality estimator 312 and a reinforcement learning (RL) engine 314 for increased accuracy of such video analytics tasks, in accordance with aspects of the present invention. It is to be appreciated that the preceding description utilizing the present invention in an office environment is merely illustrative and, thus, the video surveillance and security system 300 can be deployed in any sort of other environments, while maintaining the spirit of the present invention.

In some embodiments, the video surveillance and security system 300 can be utilized for facial detection/recognition tasks, which can be critical to many real-world applications (e.g., identifying a person of interest in airports, hospitals or arenas, authenticating individuals based on face-recognition for face-based payments, etc.), in accordance with aspects of the present invention.

In some embodiments, the video surveillance and security system 300 can utilize the server 310 to execute adaptive perceptual quality-based camera tuning (APT) using a neural network with reinforcement learning to automatically and adaptively tune the camera parameters to optimize the analytics accuracy. The APT can incorporate two key components: a perceptual no-reference quality estimator 312 and a Reinforcement Learning (RL) engine 314, in accordance with aspects of the present invention.

In various embodiments, it is not possible to obtain ground-truth in real-time to measure the accuracy of video analytics applications, and adaptive perceptual quality-based camera tuning (APT) using a neural network with reinforcement learning can be utilized to improve analytics accuracy in the absence of knowledge of the ground truth, in accordance with aspects of the present invention. To this end, a perceptual no-reference quality estimator 312, which gives an estimate of the quality of the frame produced by the video camera, can be utilized. In practice, it is notable that the better the quality of the frame, the better the analytics will be able to generate accurate insights. Therefore, in the design of APT IQA methods are utilized to enable the system to select optimal, appropriate camera settings for any of a plurality of camera deployment environments and settings. The choice of an IQA method and application of the IQA method in a RL engine 314 within APT are described in further detail herein below.

In some embodiments, a Reinforcement Learning (RL) engine 314 can automatically select the optimal/best camera settings for a particular scene. In designing the RL engine, RL algorithms such as Q-learning and SARSA, which are general techniques that are considered highly effective in learning the best action to take to maximize the reward, can be utilized. To choose between the two options, experimental comparisons were performed in the context of choosing the optimal camera settings and found that training with SARSA achieves slightly faster convergence than with Q-learning. Therefore, in an illustrative embodiment, the SARSA RL algorithm was utilized for APT, in accordance with aspects of the present invention.

Similarly to other RL algorithms, in SARSA, an agent can continuously interact with the environment (e.g., state) it is operating in, by taking different actions from a plurality of actions. As the agent takes an action, it can move into a new state or environment, and for each action, there is an associated reward or penalty, depending on whether the new state is more desirable or not. Over time, as the agent continues taking actions and receiving rewards and penalties, it learns to maximize the rewards by taking the right actions, which ultimately can lead the agent towards desirable states by iteratively applying reinforcement learning, in accordance with aspects of the present invention. In some embodiments, the reward or penalties received by the RL engine can be based on predefined criteria, including, for example, maximizing image clarity and minimizing noise, in accordance with aspects of the present invention.

The RL algorithms utilized by the RL engine 314 do not require any labeled data or a pre-trained model, but it can require a clear definition of the state, action, and reward for the RL agent/engine 314. This combination of state, action and reward is unique for each application and therefore can be carefully chosen based on the results of the RL engine 314, which ensures that the agent learns exactly what is desired and improves video analytics accuracy.

In an illustrative embodiment, definitions of state, action, and reward can be as follows. With regard to state, a state can be a tuple of two vectors, $s_t = <P_t, M_t>$, where $P_t$ consists of the current brightness, contrast, sharpness, and color-saturation parameter values on the camera, and $M_t$ consists of the measured values of brightness, contrast, colorsaturation, and sharpness of the captured frame at time t, in accordance with aspects of the present invention. With regard to action, the set of actions that the RL engine/agent 314 can take can be to increase or decrease one of the brightness, contrast, sharpness, or color-saturation parameter value, or to not to change any parameter values, in accordance with aspects of the present invention.

In some embodiments, with regard to the reward, the best-performing (e.g., experimentally chosen) perceptual quality estimator 312 can be selected as the immediate reward function (r) for the RL algorithm (e.g., SARSA). Along with considering immediate reward, the agent also can factor in future rewards that may accrue as a result of the current actions. Based on this, a value, termed as Q-value (also denoted as $Q(s_t, a_t)$) can be calculated for taking an action $a_t$ when in state $s_t$ using Equation 1, below:

$$Q(s_t,a_t) \rightarrow Q(s_t,a_t) + \alpha[r + \gamma \cdot Q(s_{t+1},a_{t+1}) - Q(s_t,a_t)], \quad \text{(Equation 1)}$$

where α is learning rate (e.g., a constant between 0 and 1) used to control how much importance is to be given to new information obtained by the agent. A value of 1 can give high importance to the new information while a value of 0 can stop the learning phase for the agent, in accordance with aspects of the present invention.

In some embodiments, similar to α, γ (also known as the discount factor) can be another constant used to control the importance given by the agent to any long-term rewards. A value of 1 can give very high importance to long term rewards while a value of 0 can cause the agent to ignore any long-term rewards and focus only on the immediate rewards. If the conditions do not change frequently (e.g., relative to a threshold frequency), a higher value (e.g., 0.9) can be assigned to prioritize long term rewards, and if the environmental conditions change very frequently (e.g., relative to a threshold frequency), a lower value (e.g., 0.1) can be assigned to γ to prioritize immediate rewards, in accordance with aspects of the present invention.

In some embodiments, a constant called ∈ (between 0 and 1) can be defined to control the balance between exploration vs. exploitation when the agent takes actions. In particular, at each step, the agent can generate a random number between 0 and 1, and if the random number is greater than the set value of ∈, then a random action (e.g., exploration) can be chosen, else it performs exploitation, in accordance with aspects of the present invention.

Figure 4:
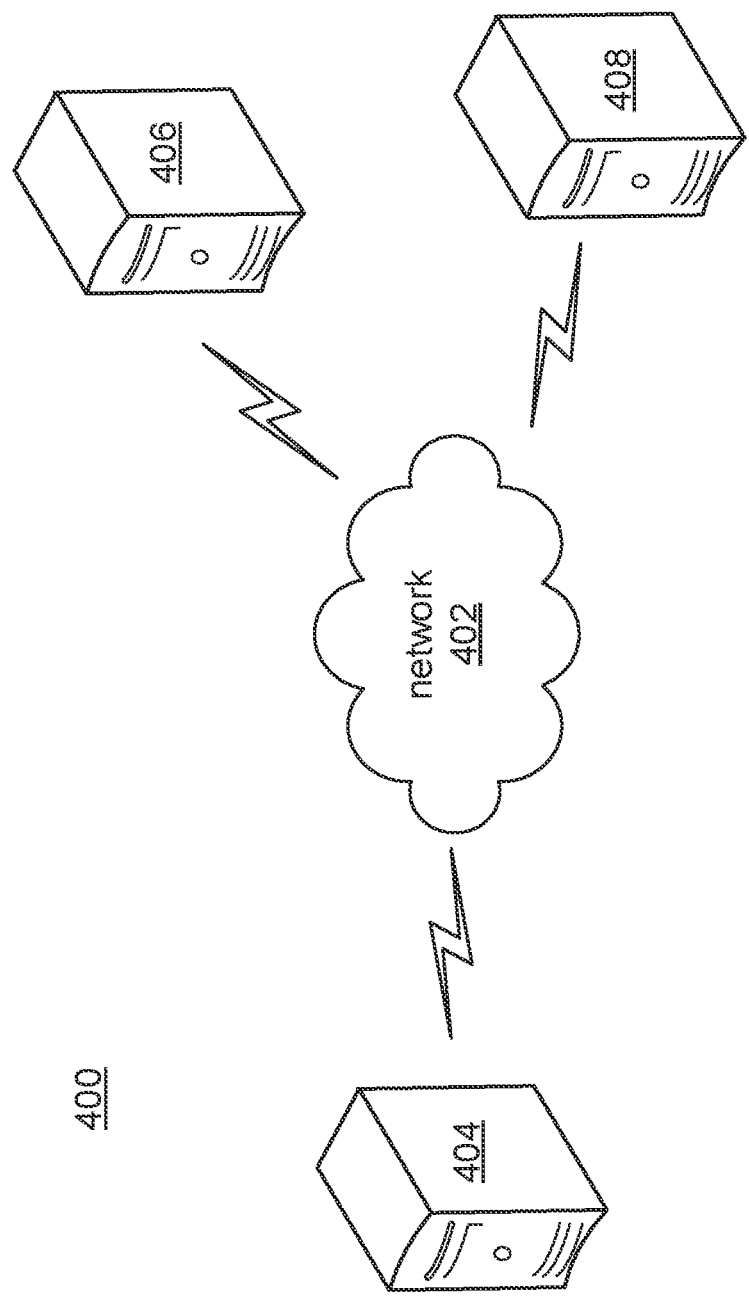
FIG. 4 shows a diagram illustratively depicting a high-level view of an exemplary interconnected computing network to which the present invention can be applied, in accordance with embodiments of the present invention.

Referring now to FIG. 4, a diagram showing a high-level view of an exemplary environment 400, including an interconnected computing network 402 to which the present invention can be applied, is illustratively depicted in accordance with embodiments of the present invention. The elements shown relative to FIG. 4 are set forth for the sake of illustration. However, it is to be appreciated that the present invention can be applied to other network configurations as readily contemplated by one of ordinary skill in the art given the teachings of the present invention provided herein, while maintaining the spirit of the present invention.

In some embodiments, the computing network 402 can include at least a set of computer processing systems 404, 406, 408. The computer processing systems 404, 406, 408 can be any type of computer processing system including, but not limited to, servers, workstations, desktops, laptops, tablets, cellphones, smart phones, media playback devices, and so forth, in accordance with aspects of the present invention. For the sake of illustration, the computer processing systems 404, 406, 408 can each represent a computer server device.

In the embodiment shown in FIG. 4, the elements thereof are interconnected by a network 402. However, in other embodiments, other types of connections can also be used in accordance with aspects of the present invention. Additionally, one or more elements in FIG. 4 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 500 are readily determined by one of ordinary skill in the art, given the teachings of the present invention provided herein, while maintaining the spirit of the present invention.

Figure 5:
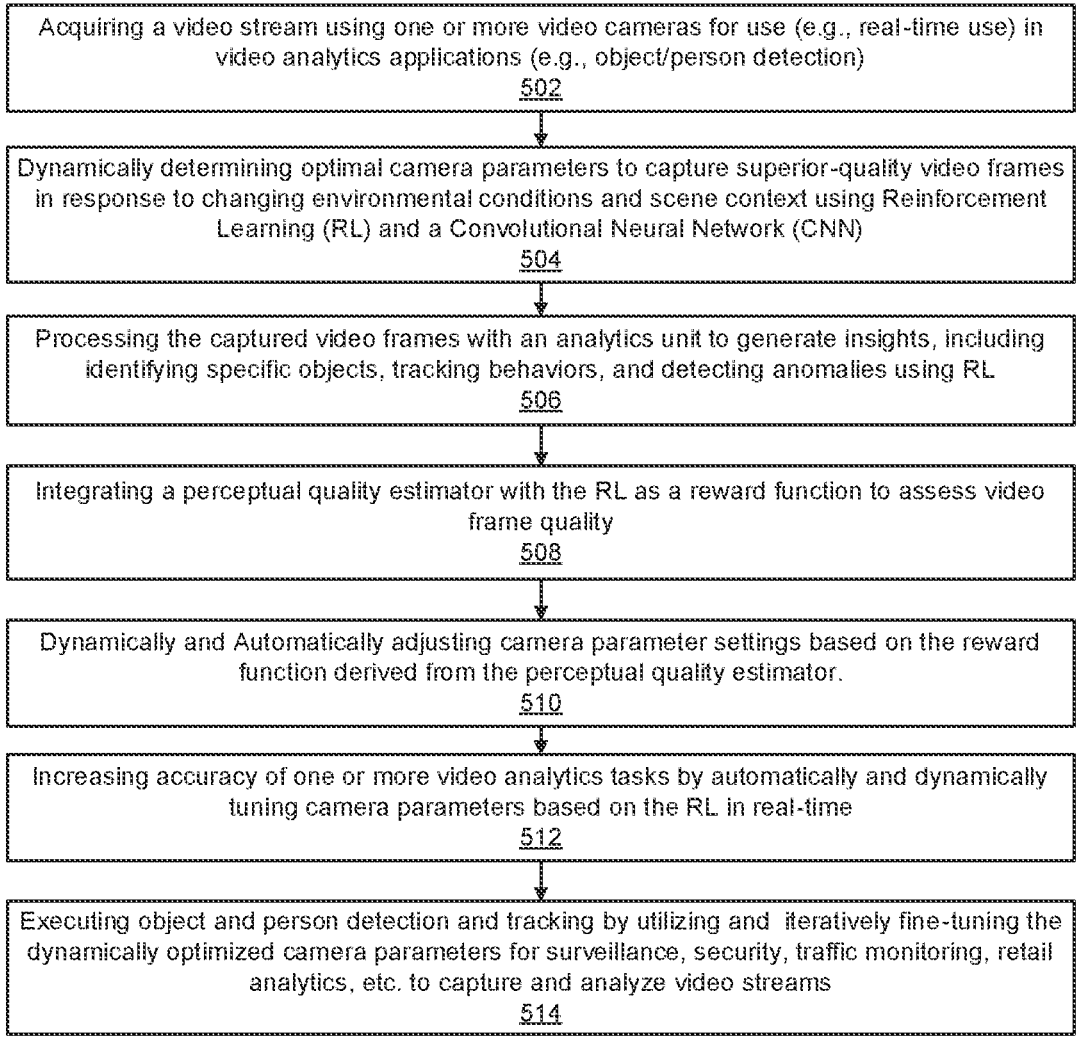
FIG. 5 is a block/flow diagram illustratively depicting a method for increasing accuracy of video analytics tasks in real-time by adaptive perceptual quality-based camera tuning (APT) using a neural network with reinforcement learning to improve accuracy of detection and tracking of objects and faces in a video, in accordance with embodiments of the present invention.

Referring now to FIG. 5, a diagram showing a method 500 for increasing accuracy of video analytics tasks in real-time by adaptive perceptual quality-based camera tuning (APT) using a neural network with reinforcement learning to improve accuracy of detection and tracking of objects and faces in a video, is illustratively depicted in accordance with embodiments of the present invention.

In various embodiments, a video/video stream can be acquired using one or more video cameras deployed in various environmental settings in block 502 for use (e.g., real-time use) in video analytics applications (e.g., object/person detection). A sequence of video frames captured using a camera can be monitored, captured, and/or received (e.g., by a server 206 with reference to FIG. 2) in block 502. In some embodiments, at 504, the method can include dynamically determining optimal camera parameters to capture superior-quality video frames in response to changing environmental conditions and scene context using Reinforcement Learning (RL) and a Convolutional Neural Network (CNN) in accordance with aspects of the present invention. At 506, the method can include processing the captured video frames with an analytics unit to generate insights, including identifying specific objects, tracking behaviors, and detecting anomalies using RL. In block 508, the RL can be integrated with a perceptual quality estimator (as a reward function) based on a convolutional neural network (CNN), where the estimator can assess video frame quality based on human perceptual aspects.

In block 510, camera parameters (e.g., brightness, color, contrast, and sharpness), can be dynamically and automatically adjusted based on the reward function derived from the perceptual quality estimator. In block 512, the camera parameters can be remotely fine-tuned (e.g., using 5G networks) to ensure consistent capture of high-quality video frames, thereby mitigating accuracy loss within the realm of video analytics insights. In block 514, the dynamically optimized camera parameters can be utilized for video analytics applications to improve the accuracy of insights generated from video frames for real-world applications, including, for example, urban surveillance, enterprise security, traffic monitoring, facial recognition, retail analytics, etc., in accordance with aspects of the present invention.

In some embodiments, the insights generated from the processed video frames can be applied to real-time decision-making in an industrial automation system in block 514. For example, automatic authorization-based door unlocking for authorized personnel through accurate facial recognition using the improved high-quality video feeds, and employing the adaptively optimized camera parameters to significantly enhance the precision of the facial recognition mechanism, in accordance with aspects of the present invention.

In some embodiments, in block 514, camera parameters can be automatically fine-tuned for industrial environments, facilitating real-time object detection and avoidance strategies, automatically identifying vehicles and machinery navigating factory floors by employing insights obtained from processed video frames and adjusting camera parameters, thereby enabling automatic adjustments to vehicle trajectories, acceleration patterns, and steering maneuvers to enhance safety measures for personnel and equipment.

In some embodiments, continuous real-time monitoring and autonomous operation of vehicles can be accomplished in block 514 by utilizing insights derived from processed video frames, employing precisely adjusted camera parameters and heightened video quality to orchestrate self-directed vehicle navigation, encompassing dynamic collision prevention, adaptive response to varying environmental conditions, and secure operation of autonomous vehicles across intricate terrains.

In some embodiments, the camera parameters may include at least one of brightness, color, contrast, and sharpness. In some embodiments, the adaptive adjustment of camera parameters may be performed by dynamically tuning configurable camera settings based on the perceptual quality estimator's reward function, thereby ensuring high-quality video feed. In some embodiments, the communication module may facilitate real-time adjustments of camera parameters over 5G networks, enabling immediate adaptation to changing conditions and ensuring consistent analytics accuracy throughout different time segments of the day, in accordance with aspects of the present invention.

Referring now to FIG. 6, a diagram showing a method 600 for increasing accuracy of video analytics tasks in real-time by adaptive perceptual quality-based camera tuning (APT) using a neural network with reinforcement learning to improve accuracy of detection and tracking of objects and faces in a video, is illustratively depicted in accordance with embodiments of the present invention.

In some embodiments, in block 602, assessment and selection of a design for a perceptual image quality assessment (IQA) method for use as the reward function in the RL engine can be performed based on their impact on analytics performance, and the best performing choice can be selected for use in APT, and an effectiveness of APT on a mock-up scene can be analyzed under different initial parameter settings and in a real-world deployment, in accordance with aspects of the present invention. In block 604, the impact of three different no-reference (blind) IQA methods (e.g., designed to estimate the quality of real-world distorted images) can be analyzed for use as APT's quality evaluator. These methods can include CNN-IQA, Hyper-IQA, and Rank-IQA. Each of these IQA methods employs a convolution network and is designed to work with low-level local features (e.g., extracted via convolution layers) for deriving insights from the input video stream.

In block 606, the IQA methods can be trained and evaluated in a controlled scene that provides controllability and replicability in an experimental setup and in real-world deployments, in accordance with aspects of the present invention. Since downstream analytics focus on low-level local features (i.e., extracted via convolution layers) for deriving insights from the input video stream, for ease of illustration, three popular perceptual IQA methods that employ convolution network can be selected for analysis. CNN-IQA can be utilized for the spatial domain without relying on hand-craft features used by previous IQA methods, as it combines feature learning and quality regression in one optimization process which leads to a more effective quality estimation model. Hyper-IQA can decouple the IQA procedure into three stages: content understanding, perception rule learning and finally quality prediction. Hyper-IQA can estimate image quality in a self-adaptive manner by adaptively running different hyper-networks. Rank-IQA can address the problem of limited size of the IQA dataset during training by using a Siamese network to rank images and then can use the ranked images to train deeper and wider convolution networks for absolute quality prediction, in accordance with aspects of the present invention.

In block 608, to assess the impact of using different IQA estimators as reward functions on the analytics performance under the same environmental conditions, a mock-up scene with a fixed number of objects (e.g., cars and persons), including 3D slot cars which are continuously moving along the track and 3D human models which are kept stationary can be utilized. In doing so, this experimentally controlled mock-up scene provides controllability and replicability in experimental setup and for real-world deployments, in accordance with aspects of the present invention.

In some embodiments, in block 610, the APT can be trained using reinforcement learning by utilizing each of these quality estimator outputs as the reward function for a predetermined time period (e.g., one hour) on the mock-up scene. During training, after every predetermined time interval (e.g., 2-minute interval), the camera parameters can be adjusted/tuned to emulate different environmental conditions. For evaluation, two identical network cameras (e.g., AXIS 3505 MK-II) can be placed side-by-side in front of the mock-up scene to determine how APT reacts to different initial camera parameter settings, and the RL engine can utilize this information for learning to identify and automatically tune the camera parameter settings to generate optimal video for analysis, in accordance with aspects of the present invention.

In various embodiments, these different IQA methods effectively guide SARSA RL agent in APT, resulting in higher true-positive object detections when compared to object detector's performance on the stream with a fixed camera setting. Table 2 presents the average improvement in true-positive object detections observed throughout multiple 2-minute time intervals, and the average number of objects detected in the steady state for the three different reward functions. We observe that Rank-IQA guides SARSA-RL agent better under environmental variations which in turn leads to more object detections from the same scene. Thus, Rank-IQA can be selected as a perceptual quality estimator for use in APT, in accordance with aspects of the present invention.

TABLE 2

Comparing IQA methods as reward functions.

| IQA | Improv. over fixed settings (Avg) % | Objs detected steady state (Avg) |
| --- | --- | --- |
| Hyper-IQA | 132.6 | 13.5 |
| CNN-IQA | 141.2 | 14.2 |
| Rank-IQA | 150.5 | 15.1 |

In block 612, the RL can include passing each video frame through a convolutional neural network (CNN), or other type of DNN, trained on a large-scale image dataset, with the CNN acting as a feature extractor, transforming each frame into a high-dimensional feature vector, and generating output of a sequence of feature vectors corresponding to the sequence of frames in the video. In block 614, the sequence of feature vectors can be passed through a temporal feature aggregation layer to capture temporal dependencies between consecutive frames, and can output a second sequence of feature vectors. The second sequence of feature vectors can be passed through a classifier to capture temporal dependencies between consecutive frames and output a prediction for the selected task.

In block 614, the entire model (including the feature extractor, the temporal feature aggregation layer, and the classifier) can be trained using, for example, end-to-end using backpropagation and an optimization algorithm (e.g., stochastic gradient descent) and/or reinforcement learning, and the training can include fine-tuning pre-trained weights of the CNN during the training. In block 616, a generated model prediction for each frame in the video can be output, considering both the visual content of the frames (e.g., captured by the CNN) and the temporal dependencies between them (e.g., captured by the temporal feature aggregation layer), in accordance with aspects of the present invention.

It is noted that embodiments of the present invention have been evaluated regarding how quickly APT can react to any initial setting and converge to a setting that can provide better analytical outcome in comparison to conventional systems and methods. This evaluation can include utilizing multiple cameras which start with same initial setting (e.g., four different camera settings denoted as S1, S2, S3 and S4, respectively for this illustrative embodiment) and stream at 10 FPS over a 2-minute period, during which the four parameters of Camera 1 are kept to the same initial values, while the parameters of Camera 2 are tuned dynamically by APT every 2 seconds. On every frame streamed from the camera, a Yolov5 object detector can be utilized to detect objects and record the type of objects with their bounding boxes. It is observed that there is an initial gap between the performance of YOLOv5 between the two camera streams which indicates that within the first 10 seconds, APT changes the camera parameters based on human-perceptual quality estimator (e.g., RANKIQA) output and achieves better object detection than conventional systems and methods. Furthermore, it is observed that APT gradually finds best-possible (e.g., optimal) settings within one minute that enables Yolov5 (or other similar models) to detect a significantly higher number of objects from a captured scene (e.g., total of up to 9 more object detections per frame compared to detections on camera stream with fixed setting), in accordance with aspects of the present invention.

Figure 7:
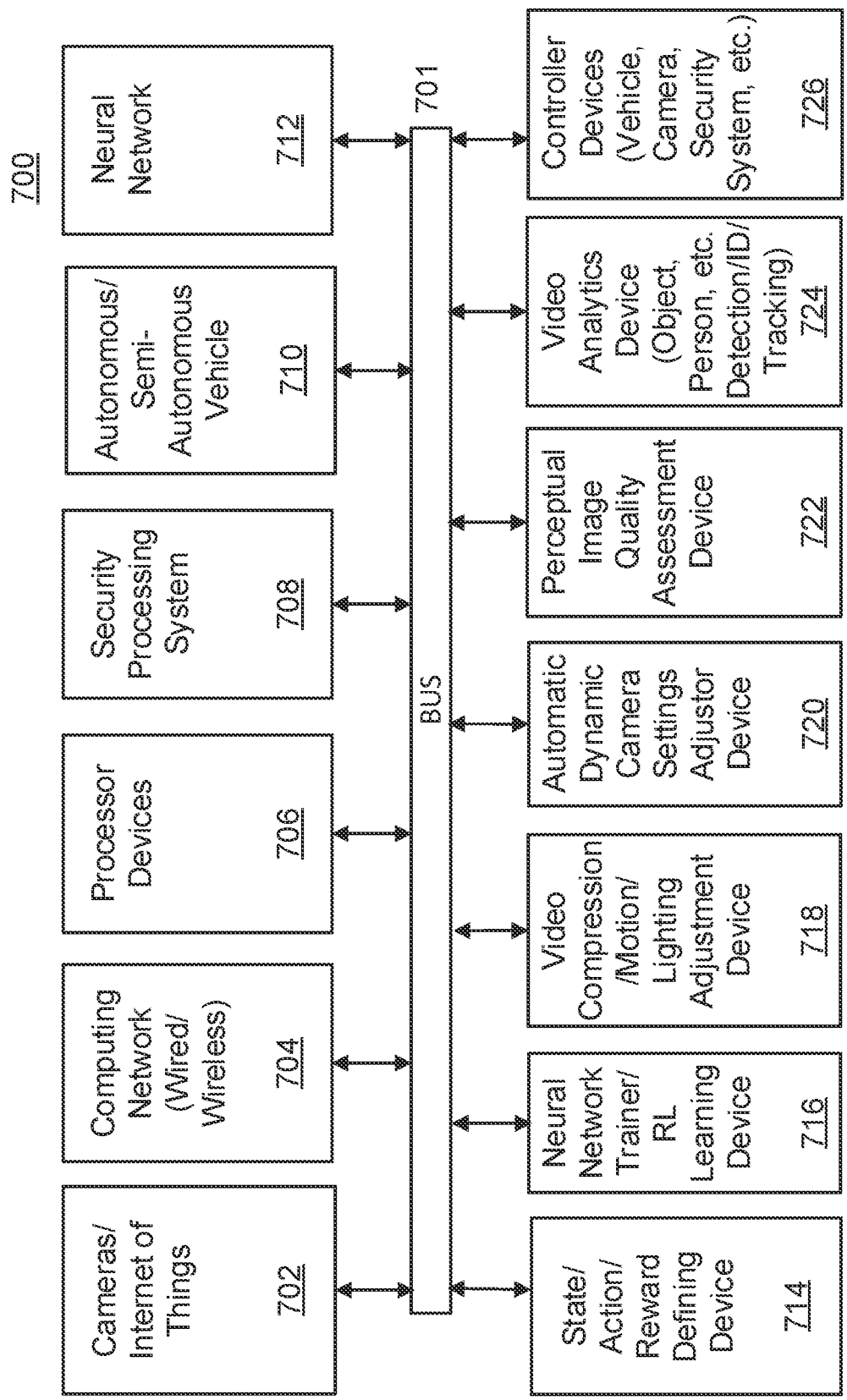
FIG. 7 is a diagram illustratively depicting a system for increasing accuracy of video analytics tasks in real-time by adaptive perceptual quality-based camera tuning (APT) using a neural network with reinforcement learning to improve accuracy of detection and tracking of objects and faces in a video, in accordance with embodiments of the present invention.

Referring now to FIG. 7, a diagram showing a system 700 for increasing accuracy of video analytics tasks in real-time by adaptive perceptual quality-based camera tuning (APT) using a neural network with reinforcement learning to improve accuracy of detection and tracking of objects and faces in a video, is illustratively depicted in accordance with embodiments of the present invention.

In various embodiments, the Internet of Things (IoT), including one or more video cameras 702 can be utilized to acquire video data, and video data streams from the cameras 702 can be transmitted over a computing network 704 (e.g., WiFi, wireless, 4G, 5G, CAN bus, LAN, WAN, wired, etc.), and can be analyzed and processed (e.g., for performing video analytics tasks) using one or more processor devices 706 and/or a neural network 712 with reinforcement learning to increase performance of video analytics applications, in accordance with aspects of the present invention. The system 700 can be utilized to improve video analytics tasks (e.g., object and people detection, tracking, identification, etc.) in, for example, a security processing system 708, an autonomous/semi-autonomous vehicle 710, or other scenarios in which accurate and fast detection and identification of objects and people in real-time is desired by a user, in accordance with aspects of the present invention.

In various embodiments, a state, action, and reward defining device 714 can define state, action, and reward as follows. With regard to state, a state can be a tuple of two vectors, $s_t=<P_t,M_t>$, where $P_t$ consists of the current brightness, contrast, sharpness, and color-saturation parameter values on the camera, and $M_t$ consists of the measured values of brightness, contrast, colorsaturation, and sharpness of the captured frame at time t, in accordance with aspects of the present invention. With regard to action, the set of actions that the RL engine/agent 314 can take can be to increase or decrease one of the brightness, contrast, sharpness, or color-saturation parameter value, or to not to change any parameter values, in accordance with aspects of the present invention.

In some embodiments, with regard to the reward, the best-performing (e.g., experimentally chosen) perceptual quality estimator 312 can be selected as the immediate reward function (r) for the RL algorithm (e.g., SARSA). Along with considering immediate reward, the agent also can factor in future rewards that may accrue as a result of the current actions. Based on this, a value, termed as Q-value (also denoted as Q ($s_t$, $a_t$)) can be calculated for taking an action a t when in state s t using Equation 1, below:

$$Q(s_t,a_t) \to Q(s_t,a_t)+\alpha[r+\gamma \cdot Q(s_{t+1},a_{t+1})-Q(s_t,a_t)], \quad \text{(Equation 1)}$$

where $\alpha$ is learning rate (e.g., a constant between 0 and 1) used to control how much importance is to be given to new information obtained by the agent. A value of 1 can give high importance to the new information while a value of 0 can stop the learning phase for the agent, in accordance with aspects of the present invention.

In some embodiments, a neural network trainer/reinforcement learning device 716 can be utilized to improve video analytics accuracy adaptive perceptual quality-based camera tuning (APT) using a neural network with reinforcement learning, in accordance with aspects of the present invention. In some embodiments, video analytics accuracy can be further improved by dynamically adaptively tuning a confidence threshold using the processor devices 706 and/or the neural network 712, using a video compression adjustment device 718 to reduce video compression, and/or an automatic dynamic camera settings adjustor device 720 to mitigate adverse effects for video analytics tasks caused by motion, setting, lighting and/or other environmental conditions in a video. A perceptual image quality assessment device 722 can generate a quality measure to quantify an effectiveness of tuning of camera parameter settings, in accordance with aspects of the present invention.

A video analytics device 724 can be utilized for any of a plurality of automated tasks (e.g., automatically unlock office door upon confirmation of identity of a person in a live video stream, automatically adjust any of a plurality of vehicle operations (e.g., accelerate, brake, etc.) to avoid objects and people, etc.) by automatically and dynamically tuning camera parameter settings in block 720. Such automated tasks in block 724 can be automatically executed using one or more local and/or remote controller devices 726, in accordance with aspects of the present invention.

In the embodiment shown in FIG. 7, the elements thereof are interconnected by a bus 701. However, in other embodiments, other types of connections can also be used. Moreover, in an embodiment, at least one of the elements of system 700 is processor-based and/or a logic circuit and can include one or more processor devices 706. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 700 are readily determined by one of ordinary skill in the art, given the teachings of the present principles provided herein, while maintaining the spirit of the present principles.

Video analytics applications heavily rely on good quality of video input to produce accurate analytics results. Notably, variations in environmental conditions and video content can lead to degradation in input video quality, leading to degradation of overall analytics insights. To mitigate this loss in accuracy, reinforcement learning techniques can be applied in accordance with various embodiments to adaptively tune camera parameters for improved video quality, thereby improving accuracy of analytics. Through real-world experiments, it is shown that the automatic and dynamic tuning of camera parameter settings, responsive to changes in environmental conditions, performs better than the fixed manufacturer-provided default camera settings, and improves the accuracy of object detection in video analytics applications by ~42% in real-world deployments, in accordance with aspects of the present invention.

Figure 8:
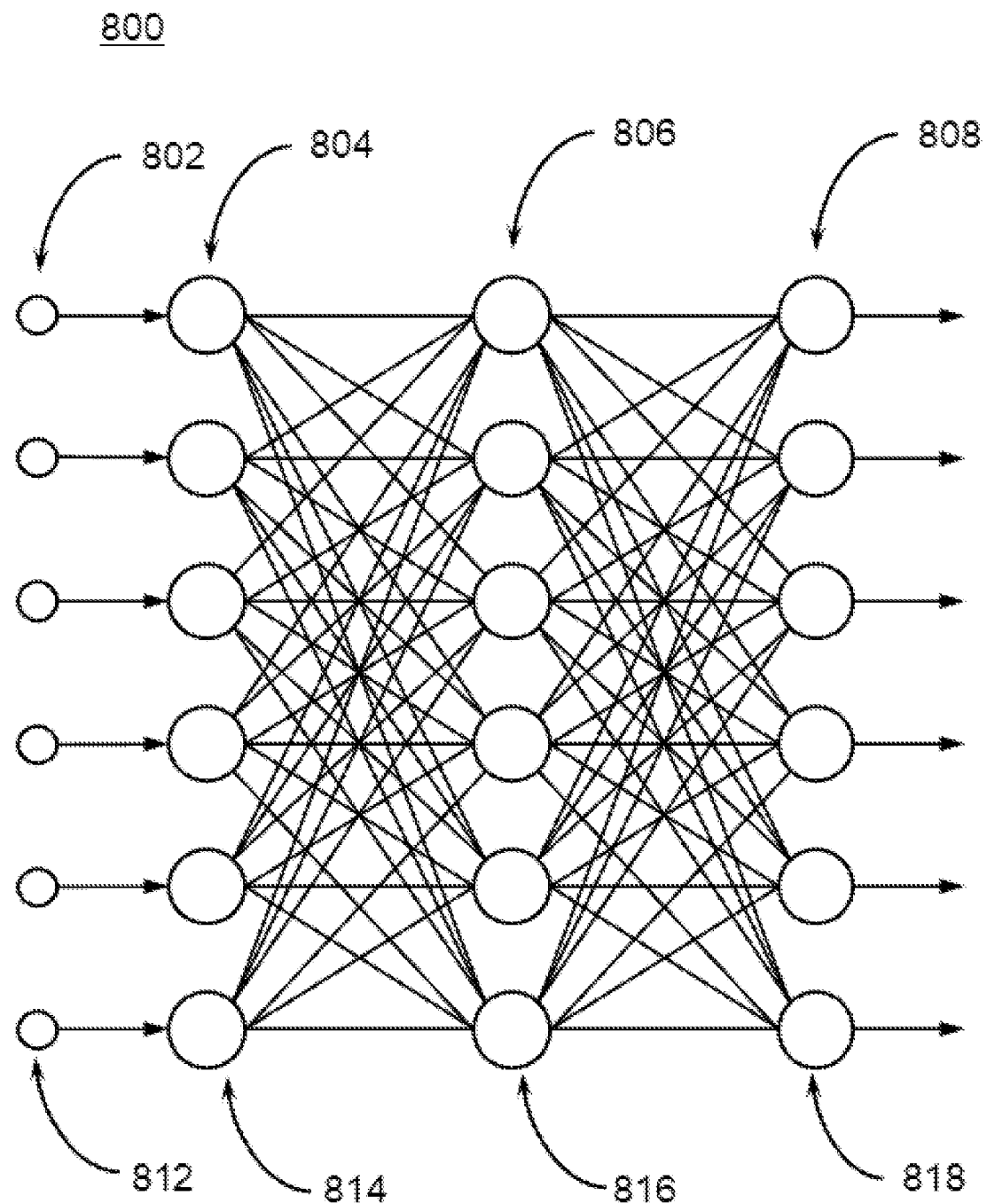
FIG. 8 is a block/flow diagram illustratively depicting a high-level view of a deep neural network, in accordance with embodiments of the present invention.

Referring now to FIG. 8, a high-level view of an exemplary deep neural network 800, is illustratively depicted in accordance with embodiments of the present invention.

A deep neural network, also referred to as a multilayer perceptron, has an input layer 804 of source nodes 814, one or more computation layer(s) 806 having one or more computation nodes 816, and an output layer 808, where there is a single output node 818 for each possible category into which the input example could be classified. An input layer 804 can have a number of source nodes 814 equal to the number of data values 812 in the input data 802. The computation nodes 816 in the computation layer(s) 806 can also be referred to as hidden layers because they are between the source nodes 814 and output node(s) 818 and not directly observed. Each node 816, 818 in a computation layer generates a linear combination of weighted values from the values output from the nodes in a previous layer, and applies a non-linear activation function that is differentiable to the sum. The weights applied to the value from each previous node can be denoted, for example, by $w_1, w_2, \ldots, w_{n-1}, w_n$. The output layer provides the overall response of the network to the inputted data. A deep neural network can be fully connected, where each node in a computational layer is connected to all other nodes in the previous layer. If links between nodes are missing the network is referred to as partially connected.

Training a deep neural network can involve two phases, a forward phase where the weights of each node are fixed and the input propagates through the network, and a backwards phase where an error value is propagated backwards through the network.

The computation nodes 816 in the one or more computation (hidden) layer(s) 808 perform a nonlinear transformation on the input data 812 that generates a feature space. In the feature space, the classes or categories may advantageously be more easily separated than in the original data space, in accordance with aspects of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for dynamically tuning camera parameters in a video analytics system (VAS) to optimize analytics accuracy, comprising:
capturing a current scene using a video-capturing camera;
learning optimal camera parameter settings for the current scene using a Reinforcement Learning (RL) engine by defining a state within the RL engine as a tuple of a first vector representing current camera parameter values and a second vector representing measured values of captured frames of the current scene, and defining sets of actions for modifying parameter values and maintaining the current parameter values;
estimating a quality of the captured frames using a perceptual no-reference quality estimator, and tuning the camera parameter settings based on the quality estimator and the RL engine to optimize analytics accuracy of the VAS;
evaluating an effectiveness of the tuning by perceptual Image Quality Assessment (IQA) to quantify a quality measure;
iteratively adaptively tuning the camera parameter settings in real-time using the RL engine, responsive to changes in the scene, based on the learned optimal camera parameter settings, the state, the quality measure, and the set of actions, to further optimize the analytics accuracy until a threshold condition is reached.

2. The method of claim 1, wherein the current scene captured by the video-capturing camera is identified using a scene classification algorithm configured to classify the scene into one of a plurality of predefined categories.

3. The method of claim 1, wherein the Reinforcement Learning (RL) engine utilizes a State-action-reward-state-action (SARSA) algorithm configured to enhance the learning and improve speed and accuracy of identification of the optimal camera parameter settings.

4. The method of claim 1, wherein the camera parameter settings are tuned responsive to a perceptual no-reference quality determination indicating a quality of the captured frames being below a quality threshold level.

5. The method of claim 1, wherein a dynamic adjustment of a constant E is integrated into the RL engine to balance between exploration and exploitation, the dynamic adjustment being based on progress of the learning by the RL engine.

6. The method of claim 1, wherein the video analytics system (VAS) is implemented in a security surveillance system configured for object detection and recognition, and the tuning of the camera parameter settings is iteratively executed at a predetermined interval to optimize the object detection and recognition.

7. The method of claim 1, wherein the tuning the camera parameter settings includes real-time adaptation to changes in lighting conditions, weather, or other environmental factors affecting the captured scene, the camera parameter settings including one or more of brightness, contrast, sharpness, and color-saturation.

8. The method of claim 1, wherein rewards or penalties received by the RL engine are based on predefined criteria, including maximizing image clarity and minimizing noise.

9. A system for optimizing analytics accuracy in a Video Analytics System (VAS) by dynamically tuning camera parameters, comprising:
a video-capturing camera configured to capture a current scene;
a processor operatively coupled to a computer-readable storage medium, the processor being configured for:
learning optimal camera parameter settings for the current scene using a Reinforcement Learning (RL) engine by defining a state within the RL engine as a tuple of a first vector representing current camera parameter values and a second vector representing measured values of captured frames of the current scene, and defining sets of actions for modifying parameter values and maintaining the current parameter values;
estimating a quality of the captured frames using a perceptual no-reference quality estimator, and tuning the camera parameter settings based on the quality estimator and the RL engine to optimize analytics accuracy of the VAS;
evaluating an effectiveness of the tuning by perceptual Image Quality Assessment (IQA) to quantify a quality measure;
iteratively adaptively tuning the camera parameter settings in real-time using the RL engine, responsive to changes in the scene, based on the learned optimal camera parameter settings, the state, the quality measure, and the set of actions, to further optimize the analytics accuracy until a threshold condition is reached.

10. The system of claim 9, wherein the current scene captured by the video-capturing camera is identified using a scene classification algorithm configured to classify the scene into one of a plurality of predefined categories.

11. The system of claim 9, wherein the camera parameter settings are tuned responsive to a perceptual no-reference quality determination indicating a quality of the captured frames being below a quality threshold level.

12. The system of claim 9, wherein a dynamic adjustment of a constant E is integrated into the RL engine to balance between exploration and exploitation, the dynamic adjustment being based on progress of the learning by the RL engine.

13. The system of claim 9, wherein the video analytics system (VAS) is implemented in a security surveillance system configured for object detection and recognition, and the tuning of the camera parameter settings is iteratively executed at a predetermined interval to optimize the object detection and recognition.

14. The system of claim 9, wherein the tuning the camera parameter settings includes real-time adaptation to changes in lighting conditions, weather, or other environmental factors affecting the captured scene, the camera parameter settings including one or more of brightness, contrast, sharpness, and color-saturation.

15. A computer program product for optimizing analytics accuracy in a Video Analytics System (VAS) by dynamically tuning camera parameters in real-time, the computer program product comprising a non-transitory computer readable storage medium having program instructions embodied therewith, the program instructions executable by a computer to cause the computer to perform a method comprising:
capturing a current scene using a video-capturing camera;
learning optimal camera parameter settings for the current scene using a Reinforcement Learning (RL) engine by defining a state within the RL engine as a tuple of a first vector representing current camera parameter values and a second vector representing measured values of captured frames of the current scene, and defining sets of actions for modifying parameter values and maintaining the current parameter values;
estimating a quality of the captured frames using a perceptual no-reference quality estimator, and tuning the camera parameter settings based on the quality estimator and the RL engine to optimize analytics accuracy of the VAS;
evaluating an effectiveness of the tuning by perceptual Image Quality Assessment (IQA) to quantify a quality measure;
iteratively adaptively tuning the camera parameter settings in real-time using the RL engine, responsive to changes in the scene, based on the learned optimal camera parameter settings, the state, the quality measure, and the set of actions, to further optimize the analytics accuracy until a threshold condition is reached.

16. The computer program product of claim 15, wherein the Reinforcement Learning (RL) engine utilizes a State-action-reward-state-action (SARSA) algorithm configured to enhance the learning and improve speed and accuracy of identification of the optimal camera parameter settings.

17. The computer program product of claim 15, wherein a dynamic adjustment of a constant E is integrated into the RL engine to balance between exploration and exploitation, the dynamic adjustment being based on progress of the learning by the RL engine.

18. The computer program product of claim 15, wherein the video analytics system (VAS) is implemented in a security surveillance system configured for object detection and recognition, and the tuning of the camera parameter settings is iteratively executed at a predetermined interval to optimize the object detection and recognition.

19. The computer program product of claim 15, wherein the tuning the camera parameter settings includes real-time adaptation to changes in lighting conditions, weather, or other environmental factors affecting the captured scene, the camera parameter settings including one or more of brightness, contrast, sharpness, and color-saturation.

20. The computer program product of claim 15, wherein rewards or penalties received by the RL engine are based on predefined criteria, including maximizing image clarity and minimizing noise.

* * * * *